US012706775B2

(12) United States Patent
Coffin et al.

(10) Patent No.: US 12,706,775 B2
(45) Date of Patent: Aug. 11, 2026

(54) INTERNET PROTOCOL COMMUNICATIONS OVER ALTERNATIVE FREQUENCY BAND OF EXISTING MIL-STD-1553 BUS

(71) Applicant: Fuse Integration, Inc., San Diego, CA (US)

(72) Inventors: Jerome V. Coffin, San Diego, CA (US); Ryan Gillespie, San Diego, CA (US); Charles Arthur Loach, San Diego, CA (US); Frank Dell Kronewitter, III, San Diego, CA (US)

(73) Assignee: Fuse Integration, Inc., San Diego, CA (US)

( * ) Notice: Subject to any disclaimer, the term of this patent is extended or adjusted under 35 U.S.C. 154(b) by 344 days.

(21) Appl. No.: 18/387,720

(22) Filed: Nov. 7, 2023

(65) Prior Publication Data

US 2024/0291688 A1 Aug. 29, 2024

Related U.S. Application Data

(60) Provisional application No. 63/448,581, filed on Feb. 27, 2023.

(51) Int. Cl.
*H04L 12/40* (2006.01)
*H04L 9/40* (2022.01)
*H04L 69/08* (2022.01)

(52) U.S. Cl.
CPC ...... *H04L 12/4013* (2013.01); *H04L 63/0485* (2013.01); *H04L 69/08* (2013.01); *H04L 2012/4028* (2013.01)

(58) Field of Classification Search
None
See application file for complete search history.

(56) References Cited

U.S. PATENT DOCUMENTS

| | | | | |
|---|---|---|---|---|
| 11,765,091 | B2 * | 9/2023 | Schwindt | H04L 69/22 370/235 |
| 2019/0280961 | A1 * | 9/2019 | Bohanan | H04L 45/28 |
| 2019/0313446 | A1 * | 10/2019 | Kim | H04W 74/02 |
| 2023/0262021 | A1 * | 8/2023 | Bouis | H04W 12/03 709/245 |

* cited by examiner

*Primary Examiner* — Anh Vu H Ly
(74) *Attorney, Agent, or Firm* — Scale LLP

(57) ABSTRACT

Military Standard 1553 (MIL-STD-1553) is a military standard that was published by the United States Department of Defense in 1973 for tactical aircraft. Despite advances in communications, many machines retain MIL-STD-1553 buses, since retrofitting the machines with newer communication systems is not always practical. However, newer subsystems for such machines tend to utilize Internet Protocol (IP) for higher bandwidth communications. Accordingly, a device is disclosed that enables IP communications over existing MIL-STD-1553 buses. This enables an existing MIL-STD-1553 bus to span the gap between two separate IP networks (e.g., subsystems) within the machine. In addition, the IP communications may utilize Standard Agreement (STANAG) 7221 to provide higher bandwidth over the existing MIL-STD-1553 buses. For added security, the IP communications may also be encrypted during transport over the MIL-STD-1553 buses.

20 Claims, 5 Drawing Sheets

INTERNET PROTOCOL COMMUNICATIONS OVER ALTERNATIVE FREQUENCY BAND OF EXISTING MIL-STD-1553 BUS

CROSS-REFERENCE TO RELATED APPLICATIONS

This application claims priority to U.S. Provisional Patent App. No. 63/448,581, filed on Feb. 27, 2023, which is hereby incorporated herein by reference as if set forth in full.

GOVERNMENT LICENSE RIGHTS

This invention was made with government support under Contract Nos. N00421-22-F-0280 and N00421-23-F-1855, which were both awarded by the Naval Air Systems Command of the United States Navy. The government has certain rights in the invention.

BACKGROUND

Field of the Invention

The embodiments described herein are generally directed to Internet Protocol (IP) communications, and, more particularly, to IP communications over an alternative frequency band of an existing MIL-STD-1553 bus, without interfering with regular communications on the MIL-STD-1553 bus.

Description of the Related Art

Military Standard 1553 (MIL-STD-1553) is a military standard that was published by the United States Department of Defense in 1973 for tactical aircraft. MIL-STD-1553, which may simply be referred to herein as "MS1553," defines the mechanical, electrical, and functional characteristics of receivers, transmitters, and cables used to implement a serial data bus ("the MS1553 bus"), as well as the message protocol. The message protocol occupies a frequency spectrum on the MS1553 bus in the range of less than 15 Megahertz (MHz).

MS1553 was first used on military aircraft, such as the F-16 Falcon, F/A-18 Hornet, AH-64 Apache, P-3C Orion, F-15 Eagle, and F-20 Tigershark. It is now used by all branches of the U.S. military and the National Aeronautics and Space Administration (NASA), as well as in non-avionic applications (e.g., land vehicles and ships) and civil applications (e.g., the James Webb space telescope). MS1553 provides inter-subsystem and intra-subsystem communications, for example, for flight-critical avionics, flight control, weapons, electrical power control, propulsion control, and the like.

MS1553 has two major limitations. Firstly, the communication bandwidth is limited to 1 Megabit per second (Mbps). While this was considered fast when MS1553 was first introduced, greater communication bandwidth is generally required or desired today. Secondly, there is no standardized interface in MS1553, by which software can communicate via the MS1553 bus. In other words, software must be customized for each specific application that utilizes the MS1553 bus.

The first limitation has been solved by the North Atlantic Treaty Organization (NATO) Standard Agreement (STANAG) 7221, which may simply be referred to herein as "S7221." S7221 defines a method for using an MS1553 bus to provide up to 100 Mbps of additional capacity, as a separate and independent binary data transport on the MS1553 bus, in a frequency spectrum above 15 MHz, which may be referred to herein as the "S7221 channel." For example, the S7221 channel may comprise or consist of the frequency band between 25 MHz and 65 MHz.

While S7221 provides substantially improved communication bandwidth, the second limitation remains. In particular, there is no standardized interface by which software, such as IP-capable software, can utilize the S7221 channel of the MS1553 bus, to communicate IP data on or through the MS1553 bus.

SUMMARY

Accordingly, systems, methods, and non-transitory computer-readable media are disclosed for Internet Protocol (IP) communications over an alternative frequency band (e.g., S7221 channel) of an existing MS1553 bus, without interfering with regular communications on the MS1553 bus. In an embodiment, a standardized interface is disclosed that provides high-speed, high-reliability IP communications over the S7221 channel of an existing MS1552 bus.

In an embodiment, a device comprises: a first adapter configured to connect to an Internet Protocol (IP) network; a second adapter configured to be connected to a Military Standard 1553 (MS1553) bus; at least one hardware processor; and software that is configured to, when executed by the at least one hardware processor, receive first IP data from the IP network via the first adapter, convert the first IP data into first transport data in accordance with Standard Agreement 7221 (S7221), and transmit the first transport data on the MS1553 bus within a frequency range that is above 15 Megahertz.

The software may be further configured to, when executed by the at least one hardware processor: receive second transport data from the MS1553 bus; convert the second transport data into second IP data in accordance with the Internet Protocol; and transmit the second IP data over the IP network.

The IP data may comprise a plurality of IP packets, wherein converting the IP data into transport data comprises converting the plurality of IP packets into messages according to the S7221.

The device may further comprise a network layer that implements bridging of the IP data between the IP network and a separate IP network. The bridging may comprise including IP addresses and physical addresses from the IP data in the transport data.

The device may further comprise a network layer that implements routing of the IP data from the IP network to a separate IP network. The routing may comprise including IP addresses from the IP data in the transport data.

The first adapter may comprise an Ethernet port. The second adapter may comprise a port for a twin-axial cable.

In an embodiment, an assembly comprises: the device; and a cryptographic module that one or both of encrypts IP data or decrypts IP data. The cryptographic module may comprise a High Assurance Internet Protocol Encryptor. The cryptographic module may encrypt the first IP data prior to be converted into the first transport data. The cryptographic module may decrypt the second IP data after being converted from the second transport data.

In an embodiment, an assembly comprises: the device; and the MS1553 bus, which comprises at least one pair of conductors. The MS1553 bus may comprise a plurality of pairs of conductors. The first transport data may be transmitted redundantly over the plurality of pairs of conductors.

The first transport data may be transmitted across the plurality of pairs of conductors in a bonded manner.

In an embodiment, a method comprises using at least one hardware processor of a device, which comprises a first adapter configured to connect to an Internet Protocol (IP) network and a second adapter configured to be connected to a Military Standard 1553 (MS1553) bus, to: receive first IP data from the IP network via the first adapter; convert the first IP data into first transport data in accordance with Standard Agreement 7221 (S7221); and transmit the first transport data on the MS1553 bus within a frequency range that is above 15 Megahertz. The method may further comprise using the at least one hardware processor to: receive second transport data from the MS1553 bus; convert the second transport data into second IP data in accordance with the Internet Protocol; and transmit the second IP data over the IP network.

In an embodiment, a non-transitory computer-readable medium has instructions stored therein, wherein the instructions, when executed by a processor of a device, which comprises a first adapter configured to connect to an Internet Protocol (IP) network and a second adapter configured to be connected to a Military Standard 1553 (MS1553) bus, cause the processor to: receive first IP data from the IP network via the first adapter; convert the first IP data into first transport data in accordance with Standard Agreement 7221 (S7221); transmit the first transport data on the MS1553 bus within a frequency range that is above 15 Megahertz; receive second transport data from the MS1553 bus; convert the second transport data into second IP data in accordance with the Internet Protocol; and transmit the second IP data over the IP network.

It should be understood that any of the features in the methods above may be implemented individually or with any subset of the other features in any combination. Thus, to the extent that the appended claims would suggest particular dependencies between features, disclosed embodiments are not limited to these particular dependencies. Rather, any of the features described herein may be combined with any other feature described herein, or implemented without any one or more other features described herein, in any combination of features whatsoever.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for Internet Protocol (IP) communications over an alternative frequency band (e.g., S7221 channel) of an existing MS-STD-1553 (MS1553) bus, without interfering with regular communications on the MS1553 bus. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. Example MS1553 Bus

Figure 1A:
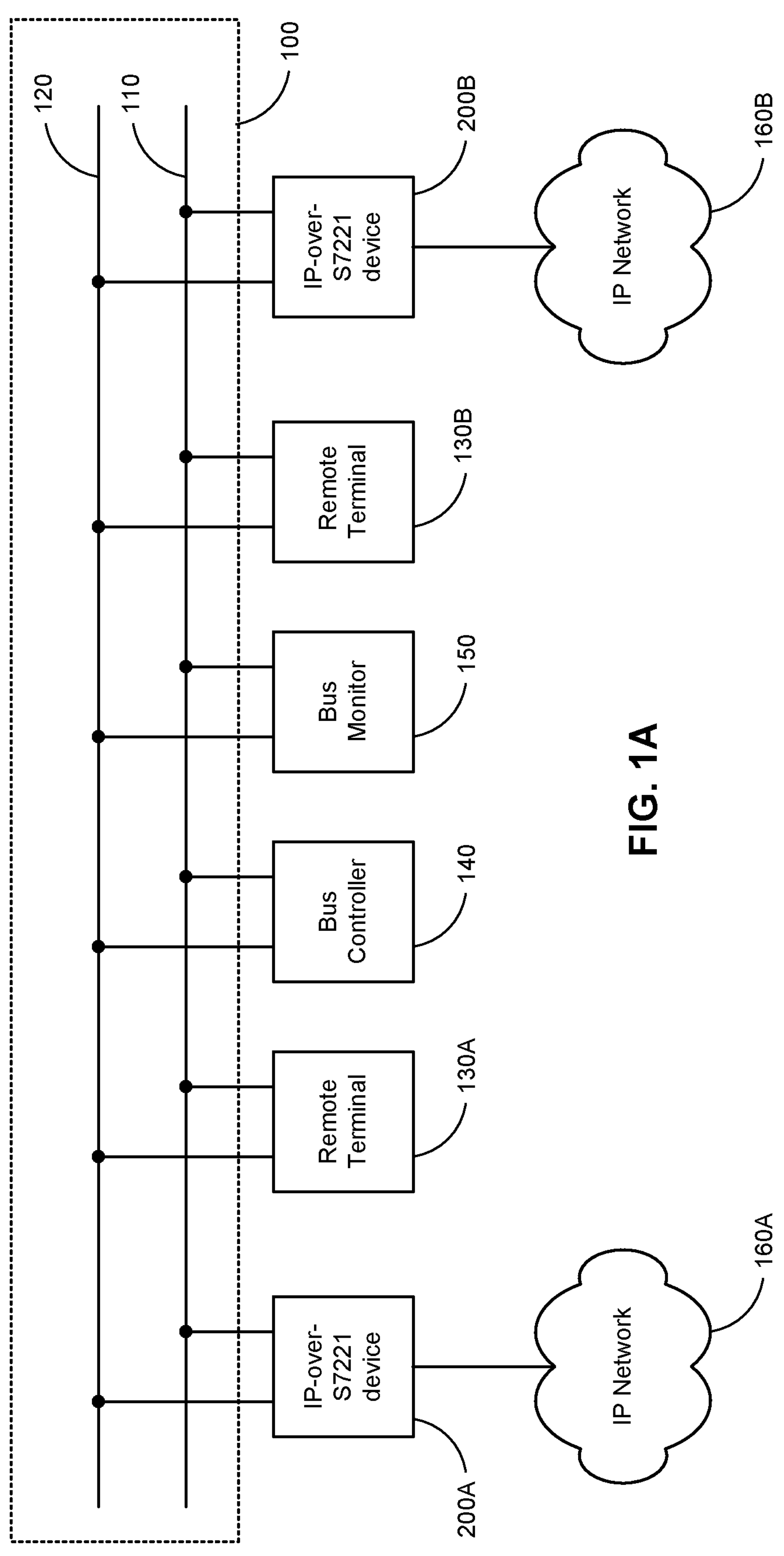
FIGS. 1A and 1B illustrate example MS1553 buses with IP-over-S7221 devices, according to embodiments.

FIG. 1A illustrates an example MS1553 bus 100 with a single pair of conductors, according to embodiment. MS1553 bus 100 may be installed within any machine. However, it is generally contemplated that the machine would be an aircraft, such as a military or commercial airplane, helicopter, drone, or the like, marine vessel, such as a military or commercial ship, boat, or the like, military, research, or commercial spacecraft, or the like. MS1553 bus 100 may be an existing bus that was previously installed, as either an original feature or retrofit, into a legacy machine.

The conductor pair comprises a first conductor 110 and a second conductor 120, which are used for differential signaling. Each of first conductor 110 and second conductor 120 comprises an electrically conductive material (e.g., copper). The conductor pair 110/120 is generally implemented as a twin-axial cable, with first conductor 110 and second conductor 120 twisted together, and a characteristic impedance of 78 ohms. First conductor 110 and second conductor 120 carry voltage signals that are equal in magnitude, but of opposite polarity. Each hardware component that is connected to MS1553 bus 100 (e.g., to send and/or receive data on MS1553 bus 100) is connected to both first conductor 110 and second conductor 120 (e.g., via bus couplers). When receiving data from MS1553 bus 100, hardware components respond to differences between the voltage signals on first conductor 110 and second conductor 120. Advantageously, with differential signaling, drift in the reference ground signal does not cause errors in interpreting the voltage signals on the conductor pair 110/120 as a binary one or zero.

Typically, at least two remote terminals 130, illustrated as remote terminals 130A and 130B, will be connected to MS1553 bus 100. One remote terminal 130 (e.g., 130A) may write data to MS1553 bus 100, and another remote terminal 130 (e.g., 130B) may read data from MS1553 bus 100. It should be understood that a remote terminal 130 may both read data from MS1553 bus 100 and write data to MS1553 bus 100. While only two remote terminals 130 are illustrated, it should be understood that there may be any number of remote terminals 130, including only one, several, hundreds, thousands, or the like.

Data according to MS1553 is transported as words. Each word is twenty (20) bits in length, with the first three (3) bits representing a synchronization field, the next sixteen (16) bits representing the payload, and the last bit being a parity bit. There are three types of words: a command word that represents a command to a remote terminal 130; a data word representing information being transported to a remote terminal 130; and a status word representing a status of a remote terminal 130.

Typically, a bus controller 140 and one or more bus monitors 150 are connected to MS1553 bus 100. Bus controller 140 controls remote terminals 130 using MS1553 bus 100 (e.g., via command words). Each bus monitor 150 may capture or record data on MS1553 bus 100, for example, for data analysis. It should be understood that remote terminal(s) 130, bus controller 140, and bus monitor (s) 150 are implementations of devices defined by MS1553.

Embodiments add one or more IP-over-S7221 device(s) 200. In particular, at least one IP-over-S7221 device 200 is connected to MS1553 bus 100. In an embodiment, at least two IP-over-S7221 devices 200A and 200B are connected to MS1553 bus 100. However, it should be understood that any number of IP-over-S7221 devices 200 may be connected to MS1553 bus 100, including one, two, three, four, and so on. Each IP-over-S7221 device 200 may comprise a MS1553 port that is configured to be connected to MS1553 bus 100. For example, the MS1553 port may be configured for a twin-axial cable or other cable that is configured to connect to MS1553 bus 100.

Each IP-over-S7221 device 200 may also be connected to an IP network 160. For example, IP-over-S7221 device 200A is connected to IP network 160A, and IP-over-S7221 device 200B is connected to IP network 160B. Each IP network 160 may be an Ethernet network. For example, each IP-over-S7221 device 200 may comprise an Ethernet port, and one end of an Ethernet cable may be plugged into the Ethernet port of IP-over-S7221 device 200, while the other end of the Ethernet cable may be plugged into an Ethernet port in an Ethernet segment in the respective IP network 160. The Ethernet port of the Ethernet segment may be within an Ethernet router, a subsystem of the machine in which MS1553 bus 100 is installed, or the like. Examples of subsystems include, without limitation, flight-critical avionics, flight control, weapons, electrical power control, propulsion control, and/or the like.

IP-over-S7221 device 200 acts as a standardized interface between a respective IP network 160 and the S7221 channel of MS1553 bus 100. Each IP-over-S7221 device 200 converts IP data that are received from an IP network 160 into transport data that are then transmitted over MS1553 bus 100, and/or converts transport data that are received from MS1553 bus 100 into IP data that are then transmitted over an IP network 160. The transport data are received and/or transmitted by IP-over-S7221 device within the S7221 channel of MS1553 bus 100. Accordingly, the transport data may also be referred to herein as "S7221 data." The S7221 channel is a range of the frequency spectrum above 15 MHz, such as in the frequency band of 25 MHz to 65 MHz.

When at least two IP-over-S7221 devices 200 are connected to MS1553 bus 100, MS1553 bus 100 may be used to transport IP data between different IP-compliant systems (e.g., subsystems connected to IP networks 160A and 160B). In other words, IP-over-S7221 devices 200 may be used to transform an existing MS1553 bus 100 into a path for IP communications. In addition, IP-over-S7221 devices 200 utilize the S7221 channel, such that these IP communications do not interfere with operation of the existing MS1553 bus 100 and can be transported at a higher bandwidth (e.g., 100 Mbps or greater). In other words, remote terminal(s) 130, bus controller 140, and bus monitor(s) 150 of the existing MS1553 bus 100 will continue to operate normally, according to MS1553, without interference from the IP communications in the S7221 channel.

Figure 1B:
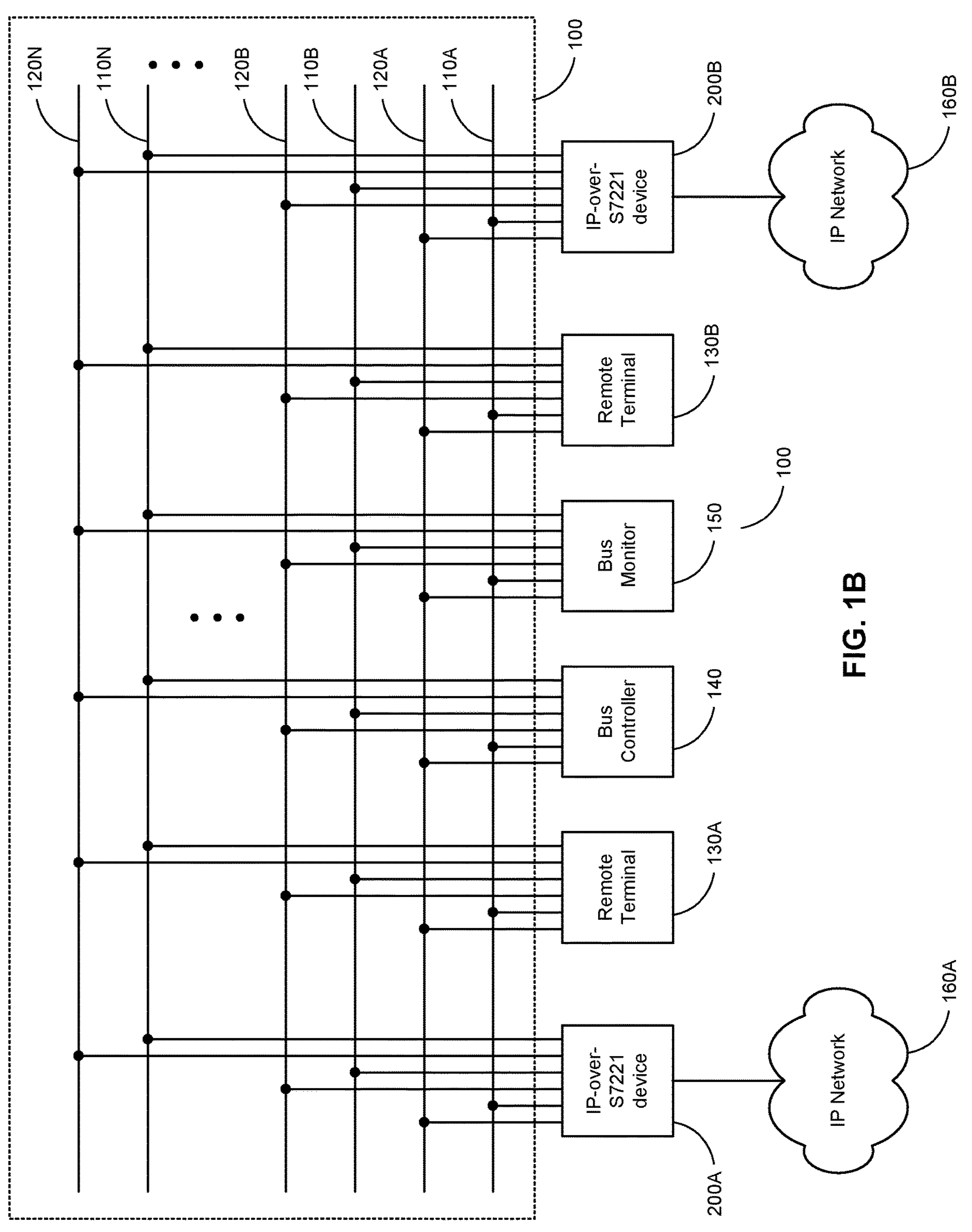

FIG. 1B illustrates an example MS1553 bus 100 with a plurality of pairs of conductors 110/120, according to embodiment. In this case, MS1553 bus 100 may comprise two, three, or any number N of pairs of first conductor 110 and second conductor 120. For instance, MS1553 bus 100 may comprise a first conductor pair 110A/120A, a second conductor pair 110B/120B, and an N-th conductor pair 110N/120N. All of the devices connected to MS1553 bus 100, including remote terminal(s) 130, bus controller 140, bus monitor(s) 150, and IP-over-S7221 device(s) 200, may be connected to each conductor 110 and 120 in each conductor pair 110/120. The plurality of conductor pairs 110/120 may be comprised in the same twin-axial cable (e.g., in a twisted configuration) and/or separate twin-axial cables.

As an example, MS1553 bus 100 may consist of two or three conductor pairs 110/120 for redundancy. In this case, each conductor pair 110/120 may transport the same redundant data. In other words, the transport data are transmitted redundantly over the plurality of pairs of conductors 110 and 120. Thus, if one conductor pair 110/120 fails, the same redundant data will remain available to IP-over-S7221 device 200 on the other conductor pair(s) 110/120. It should be understood that the number of conductor pairs 110/120 that are used will define the level of redundancy.

As another example, MS1553 bus 100 may comprise two, three, or more conductor pairs 110/120 for bonding (i.e., to increase communication bandwidth). In this case, each conductor pair 110/120 may transport different data. Thus, for instance, IP-over-S7221 device 200 may split data across the conductor pairs 110/120 to increase the amount of data that can be transported on MS1553 bus 100 at one time. In other words, the transport data are transmitted across the plurality of pairs of conductors 110 and 120. In addition, the transport data may be load-balanced across the bonded conductor pairs 110/120. It should be understood that the communication bandwidth scales linearly with the number of bonded conductor pairs 110/120.

As a further example, MS1553 bus 100 may comprise a plurality of conductor pairs 110/120 that implement both redundancy and bonding. For example a first set of M conductor pairs 110/120 may be used to transport different data for increased communication bandwidth, and a second set of M conductor pairs 110/120 may be used to transport redundant data that are the same as the data transported on the first set of M conductor pairs 110/120. It should be understood that, in this case, there will be a total of N=2M conductor pairs 110/120, or more generally, N=XM, in which X represents the level of redundancy. The level of redundancy may be increased by increasing the value of X (i.e., adding more set(s) of M conductor pairs 110/120), and the bandwidth may be increased by increasing the value of M (i.e., adding more conductor pairs 110/120 to each set).

2. IP-Over-S7221 Device

Figure 2:
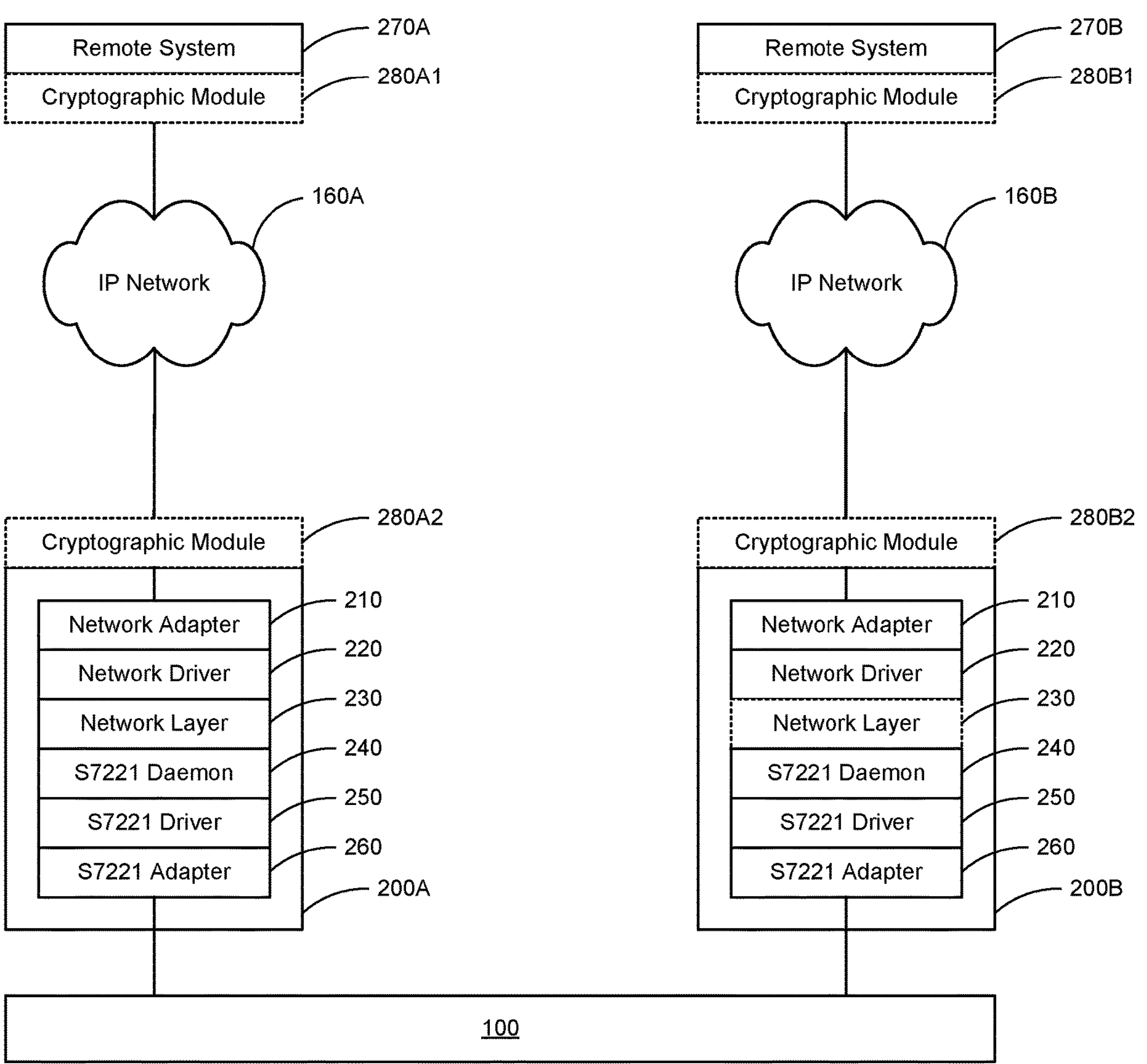
FIG. 2 illustrates the architecture of IP-over-S7221 devices, according to an embodiment.

FIG. 2 illustrates the architecture of IP-over-S7221 devices 200, according to an embodiment. In the illustrated embodiment, each IP-over-S7221 device 200 may comprise a network adapter 210, a network driver 220, a network layer 230, a S7221 daemon 240, a S7221 driver 250, and/or an S7221 adapter 260. In an embodiment, all of these components are implemented as software modules that are executed by one or more hardware processors onboard IP-over-S7221 device 220. In an alternative embodiment, all of these components may be implemented as a hardware component, such as special-purpose processor, integrated circuit (IC), application-specific integrated circuit (ASIC), digital signal processor (DSP), field-programmable gate array (FPGA) or other programmable logic device, discrete gate or transistor logic, or the like. In yet another alternative embodiment, one or more of these components may be implemented as a software module and one or more other components may be implemented as a hardware component. For example, network adapter 210 and S7221 adapter may be hardware components, and network driver 220, network layer 230, S7221 daemon 240, and S7221 driver may be software modules.

Each IP-over-S7221 device 200 may be connected to an IP network 160. For example, IP network 160 may be an Ethernet network. In this case, IP-over-S7221 device 200 may comprise an Ethernet port (e.g., within network adapter 210). One end of an Ethernet cable may be connected to the Ethernet port of IP-over-S7221 device 200, while the other end of the Ethernet cable is connected to an Ethernet device on a segment of the Ethernet network. Alternatively, IP network 160 could be a wireless communication network, and IP-over-S7221 device 200 (e.g., network adapter 210) may be wirelessly connected to IP network 160 via a wireless communication link. However, it should be understood that a wireless connection may not be as reliable, and therefore, may not be suitable for many applications. Thus, in a preferred embodiment, the connection between IP-over-S7221 device 200 and IP network 160 is a wired connection.

Each IP-over-S7221 device 200 may comprise a network adapter 210 that receives IP data from IP network 160 and/or transmits IP data to IP network 160. Network adapter 210 may be a hardware component, such as a network interface card (NIC), that enables communication using a physical layer and data link layer of a particular standard. In the event that IP network 160 is an Ethernet network, network adapter 210 may comprise an Ethernet adapter, which enables communication using the physical layer and data link layer of the Ethernet standard. In the event that IP network 160 may be a wireless network, network adapter 210 may comprise a WI-FI™ adapter, which enables communication using the physical layer and data link layer of the WI-FI™ standard.

Network adapter 210 may be enabled and managed by a software-based network driver 220. In particular, network driver 220 may provide the data link protocol (e.g., Ethernet) that activates the reception of IP data from IP network 160 through network adapter 210 and/or the transmission of IP data from network adapter 210 to IP network 160. In particular, network driver 220 controls network adapter 210 to transmit IP data from network layer 230 over IP network 160 and/or receive IP data from IP network 160 and provide the received IP data to network layer 230.

Network layer 230 may perform standard networking functions, such as bridging, tunneling, and/or routing IP data between IP network 160 and MS1553 bus 100. Bridging refers to connecting IP network 160A and IP network 160B, on either side of MS1553 bus 100, as if they were a single IP network. In this case, IP data on IP network 160A may be transferred to IP network 160B, via MS1553 bus 100, whenever the address (e.g., Media Access Control (MAC) address) of IP data on IP network 160A corresponds to an address on IP network 160B, and vice versa. Bridging transfers the complete IP data packets, including physical addresses (i.e., Layer 2 of the Open Systems Interconnection (OSI) model) and IP addresses (i.e., Layer 3 of the OSI model) between IP network 160A and IP network 160B. Tunneling refers to using encapsulation to pass the IP data through MS1553 bus 100 (e.g., to another IP-over-S7221 device 200 connected to MS1553 bus 100). Routing refers to the process of selecting an optimal path for IP data within IP networks 160, using IP addresses (i.e., Layer 3 of the OSI model).

S7221 daemon 240 may convert IP data from network layer 230 into S7221 data and/or convert transport data received by S7221 adapter 260 into IP data. In other words, S7221 daemon 240 may translate between IP data and S7221 data. S7221 data that are converted from IP data may be passed to S7221 adapter 260 and/or IP data that are converted from S7221 data may be passed to network layer 230.

S7221 adapter 260 may be enabled and managed by a software-based S7221 driver 250. In particular, S7221 driver 250 may provide the S7221 data link protocol that activates the actual reception of transport data from MS1553 bus 100 through S7221 adapter 260 and/or transmission of transport data from S7221 adapter 260 onto MS1553 bus 100. In particular, S7221 driver 250 controls S7221 adapter 260 to transmit S7221 data from network layer 230 over the S7221 channel of MS1553 bus 100 and/or receive S7221 data from the S7221 channel of MS1553 bus 100 and provide the received S7221 data to network layer 230.

S7221 adapter 260 receives transport data from the S7221 channel of MS1553 bus 100 and/or transmits transport data on the S7221 channel of MS1553 bus 100. S7221 adapter 260 may be a hardware component, such as an S7221 physical media interface, that enables communication over the S7221 channel of MS1553 bus 100. IP-over-S7221 device 200 may comprise an MS1553 port (e.g., within S7221 adapter 260). One end of a cable (e.g., twin-axial cable) may be connected to the MS1553 port, while the other end of the cable is connected to a port of MS1553 bus 100.

IP-over-S7221 device 200 may be connected to a remote system 270 via IP network 160. For example, IP-over-S7221 device 200A communicates with remote system 270A via IP network 160A, and IP-over-S7221 device 200B communicates with remote system 270B via IP network 160B. IP networks 160A and 160B may be separate, unconnected networks (e.g., within different physical spaces of the overarching machine), such that remote system 270A and remote system 270B are not able to communicate with each other via an IP network. In this case, remote system 270A may transmit IP data (e.g., a request or response) over IP network 160A to IP-over-S7221 device 200A, which may convert the IP data into transport (7221) data that are transmitted to IP-over-S7221 device 200B over the S7221 channel of MS1553 bus 100. IP-over-S7221 device 200B receives the transport (7221) data in the S7221 channel of MS1553 bus 100, converts the transport data to IP data, and transmits the IP data over IP network 160B to remote system 270B. It should be understood that remote system 270B may transmit IP data (e.g., a response or a request) to remote system 270A in a similar manner, but reversed. Thus, remote systems 270A and 270B are able to communicate to each other via IP-over-S7221 devices 200A and 200B, which transport data over MS1553 bus 100.

Remote system 270 may be any arbitrary system that is connected to IP network 160. For example, remote system 270 may be a server or other computing device that executes an IP-enabled software application. Within the context of a machine, remote system 270 may be a subsystem of the machine. According to disclosed embodiments, one remote system 270A may communicate with another remote system 270B, despite not being connected by an IP network 160, via IP-over-S7221 devices 200 that have been connected to an existing MS1553 bus 100, which spans at least a portion of the physical space between remote systems 270A and 270B. This is especially advantageous in avionic systems (e.g., in military aircraft), where space is limited or it is otherwise difficult to run new cabling (e.g., Ethernet cables). Generally, a MS1553 bus 100 will already be installed in the machine. It should be understood that any number of IP networks 160 may be connected to each other in this manner, each using a respective IP-over-S7221 device 200 connected to an MS1553 bus 100.

In an embodiment that utilizes encryption, one or more cryptographic modules 280 may be used. Each cryptographic module 280 may comprise or consist of a High Assurance Internet Protocol Encryptor (HAIPE). HAIPE is a Type 1 encryption device that complies with the U.S. National Security Agency's HAIPE interoperability specification. HAIPE 280 may comprise any cryptographic equipment, assembly, or component classified or certified by the National Security Agency (NSA) for encrypting and decrypting classified and sensitive national security information when appropriately keyed. In an alternative embodiment in which HAIPE is not required, cryptographic module 280 may comprise any other suitable cryptographic mechanism. Cryptographic module 280 may be external to IP-over-S7221 device 200 or internal to IP-over-S7221 device 200. In an embodiment in which cryptographic module 280 is internal to IP-over-S7221 device 200, cryptographic module may be positioned between IP network 160 and network adapter 210, between network adapter 210 and network layer 230, or between network layer 230 and S7221 daemon 240. Cryptographic module 280 may be implemented as a hardware component or a software component. In an embodiment which does not require encryption, cryptographic modules 280 may be omitted.

Cryptographic module 280 may encrypt IP data prior to transmission over IP network 160, decrypt encrypted IP data that are received over IP network 160, encrypt IP data that are received over IP network 160 prior to conversion into S7221 data, and/or decrypt IP data that have been converted from S7221 data after transmission over MS1553 bus 100. As one possible example, IP data transmitted by remote system 270A may be encrypted by cryptographic module 280A1, prior to transmission over IP network 160A, and then decrypted by cryptographic module 280A2 prior to conversion into S7221 data by IP-over-S7221 device 200A. As another possible example, IP data transmitted by IP-over-S7221 device 200B may be encrypted by cryptographic module 280B2 prior to transmission over IP network 160B, and then decrypted by cryptographic module 280B1 prior to being provided to remote system 270B or at remote system 270B. As yet another possible example, IP data received over network 160A may be encrypted by cryptographic module 280A2 prior to being converted into S7221 data by IP-over-S7221 device 200A and transmitted over MS1553 bus 100, and then decrypted by cryptographic module 280B2 after being converted back into IP data by IP-over-S7221 device 200B. Advantageously, in this case, the S7221 data that are transmitted over MS1553 bus 100 is are (e.g., ciphertext). Notably, this does not change the operation of MS1553 bus 100 or the S7221 channel in any way, since the operation of MS1553 bus 100 and S7221 channel are agnostic to the data being transmitted over MS1553 bus 100. In applications in which the data are being relayed through MS1553 bus 100 from one IP-over-S7221 device 200A to another IP-over-S7221 device 200B or vice versa, none of remote terminals 130 on MS1553 bus 100 need to be able to read the data.

3. Example Processes

Embodiments of processes for IP communications over an existing MS1553 bus 100 will now be described in detail. While the processes, described herein, are illustrated with a certain arrangement and ordering of subprocesses, each process may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

Figures 3, 4:
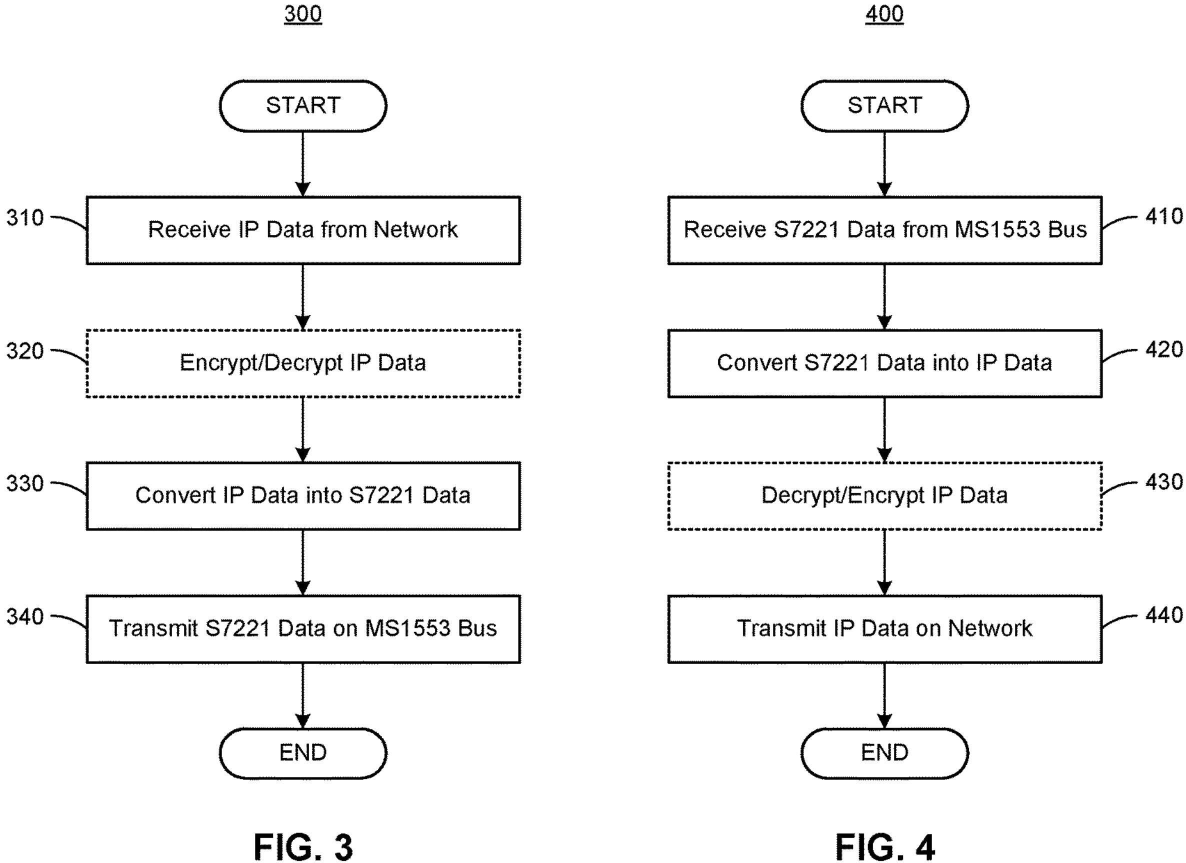
FIGS. 3 and 4 illustrate processes implemented by an IP-over-S7221 device, according to an embodiment.

FIG. 3 illustrates a process 300 for converting IP data from an IP network 160 into transport data in the 7221 channel on a MS1553 bus 100, according to an embodiment. Process 300 may be implemented by each IP-over-S7221 device 200 as software, hardware, or a combination of software and hardware.

In subprocess 310, IP data are received from IP network 160. For example, IP data may be received by network adapter 210 under the control of network driver 220. The IP data may comprise a plurality of IP data packets, collectively representing a message to be sent over MS1553 bus 100. For example, the IP data may comprise IP packets representing a message sent by remote system 270A to remote system 270B.

In an embodiment in which encryption is used, in subprocess 320, the IP data received in subprocess 310 are encrypted (e.g., if sent as plain text over IP network 160 and to be sent as ciphertext over MS1553 bus 100) or decrypted (e.g., if sent as ciphertext over IP network 160 and to be sent as plain text over MS1553 bus 100). Subprocess 320 may be performed by cryptographic module 280, which may implement HAIPE. In an embodiment in which IP-over-S7221 device 200 does not need to perform encryption, subprocess 320 may be omitted. In this case, if the IP data are transmitted over IP network 160 without encryption, the plain text will be converted into S7221 data and transported over MS1553 bus 100, and if the IP data are transmitted over IP network 160 with encryption, the ciphertext will be converted into S7221 data and transported over MS1553 bus 100.

In subprocess 330, the IP data, whether encrypted or unencrypted, is converted into transport (S7221) data. In particular, the data are converted from the Internet Protocol into the message protocol of S7221. For example, the IP packets in the IP data may be converted into a bitstream that is packaged into the payloads of messages that are sent on MS1553 bus 100, according to S7221. Thus, the 7221 data may comprise or consist of a plurality of messages that contains the binary value of IP data as payloads. Subprocess 330 may be implemented by S7221 daemon 240.

In subprocess 340, the S7221 data are transmitted in the S7221 channel of MS1553 bus 100. In particular, the messages in the S7221 data, whose payloads represent IP packets, may be transmitted in a frequency range above 15 MHz (e.g., 25 MHz to 65 MHz) on MS1553 bus 100. It should be understood the S7221 channel is agnostic to the fact that the S7221 data represents IP packets. In the case that MS1553 bus 100 comprises a plurality of conductor pairs 110/120, the S7221 data may be transmitted in a redundant manner (i.e., same data) on two or more conductor pairs 110/120 to provide redundancy and/or in a bonded manner (i.e., different data) on two or more conductor pairs 110/120 to provide increased communication bandwidth.

FIG. 4 illustrates a process 400 for converting transport data from a MS1553 bus 100 into IP data on an IP network 160, according to an embodiment. Process 400 may be implemented by each IP-over-S7221 device 200 as software, hardware, or a combination of software and hardware. Process 400 is essentially the reverse of process 300. In other words, whereas process 300 converts IP data into transport data for transport on MS1553 bus 100, process 400 converts transport data into IP data for communication over IP network 160.

In subprocess 410, transport (S7221) data are received from the S7221 channel of MS1553 bus 100. For example, S7221 data may be received by S7221 adapter 260 under the control of S7221 driver 250. The S7221 data may comprise messages transmitted in the 7221 channel on at least one conductor pair 110/120 of MS1553 bus 100. Collectively, the payloads of the messages of the S7221 data represent the IP data being transported over MS1553 bus 100. For example, the IP data may comprise IP packets representing a message sent by remote system 270B to remote system 270A.

In subprocess 420, the S7221 data is converted into IP data. In particular, the data are converted from the message protocol of S7221 into the Internet Protocol. For example, the messages of the S7221 data may be converted back into IP packets for communication across IP network 160. Subprocess 420 may be implemented by S7221 daemon 240.

In an embodiment in which encryption is used, in subprocess 430, the IP data produced by subprocess 420 are decrypted (e.g., if sent as ciphertext over MS1553 bus 100 and to be sent as plain text over IP network 160) or encrypted (e.g., if sent as plain text over MS1553 bus 100 and to be sent as ciphertext over IP network 160). Subprocess 430 may be performed by cryptographic module 280, which may implement HAIPE. In an embodiment in which IP-over-S7221 device 200 does not need to perform encryption, subprocess 430 may be omitted. In this case, if the data are transmitted over MS1553 bus 100 without encryption, the plain text will be converted into IP data and transported over IP network 160, and if the data are transmitted over MS1553 bus 100 with encryption, the ciphertext will be converted into IP data and transported over IP network 160.

In subprocess 440, the IP data are transmitted to remote system 270 over IP network 160. In particular, the IP data are transmitted using the Internet Protocol. Remote system 270 may be any system that is connected to IP network 160. However, it is generally contemplated that remote system 270 would be a subsystem of a machine.

4. Example Application

While not a necessity, it is generally contemplated that the benefits of disclosed embodiments would be maximal within a machine that has an existing MS1553 bus 100. For example, the machine may be an aircraft, such as a military or commercial airplane, helicopter, drone, or the like, marine vessel, such as a military or commercial ship, boat, or the like, military, agency, or commercial spacecraft, or the like. In these cases, there may be significant design limitations, especially with respect to space, weight, and/or reliability.

Many such machines may have been designed prior to the advent of Internet Protocol, but may need to be retrofitted with subsystems that utilize Internet Protocol. However, given the significant design limitations, it may be difficult, expensive, or infeasible to run the cables (e.g., Ethernet cables) required for IP communications between two or more subsystems, within the available space between those subsystems. In addition, wireless communications may not be feasible due to the need for reliable communications between critical subsystems and/or the significant interference that may occur during operation of the machine.

Thus, it would be advantageous if the existing MS1553 bus(es) 100 could be used for IP communications. In particular, one or more existing MS1553 buses 100 may already have been installed within spaces between the subsystems that need to be communicatively coupled. In this case, an existing MS1553 bus 100 may be used to bridge the gap in available IP-capable cabling between the subsystems. In particular, an IP-over-S7221 device 200 may be connected to each end of an existing MS1553 bus 100 that runs between the subsystems. It should be understood that the subsystems are examples of remote systems 270. Each IP-over-S7221 device may be connected to both MS1553 bus 100 and an IP network 160 to translate data between MS1553 bus 100 and IP network 160. It should be understood that IP network 160 may be an Ethernet network that connects IP-over-S7221 device to a single remote system 270 (e.g., via a direct Ethernet connection) or to a plurality of remote systems 270 (e.g., via a plurality of indirect Ethernet connections).

In an embodiment, the IP-over-S7221 device 200 utilizes the S7221 channel of MS1553 bus 100 (i.e., in a frequency range over 15 MHz) to provide high-speed IP communications across MS1553 bus 100, without interfering with standard operations (e.g., below 15 MHz) on MS1553 bus 100. In other words, standard operations, according to the MS1553 standard may continue on MS1553 bus 100 (i.e., in the frequency range below 15 MHZ), while IP communications are transported in the S7221 channel (i.e., in a frequency range above 15 MHz). In an embodiment in which network layer 230 provides a bridging function, both OSI Layer-2 and Layer-3 addressing may be transported across MS1553 bus 100. In an embodiment in which network layer 230 provides a routing function, OSI Layer-3 addressing may be transported across MS1553 bus 100. For added security, the data transported by IP-over-S7221 devices 200 across MS1553 bus 100 may be encrypted using cryptographic modules 280 on both ends of MS1553 bus 100, to encrypt data being transmitted on MS1553 bus 100 and decrypt data being received on MS1553 bus 100.

Notably, IP-over-S7221 device 200 may be attached to a MS1553 bus 100 in a plug-and-play manner to support any IP-capable application on any remote system 270 (e.g., subsystem). Advantageously, customized software no longer has to be written for each specific application that utilizes MS1553 bus 100. Instead, IP-over-S7221 device 200 can simply be connected to MS1553 bus 100 to provide a standardized interface for any IP-capable application.

5. Example Processing Device

Figure 5:
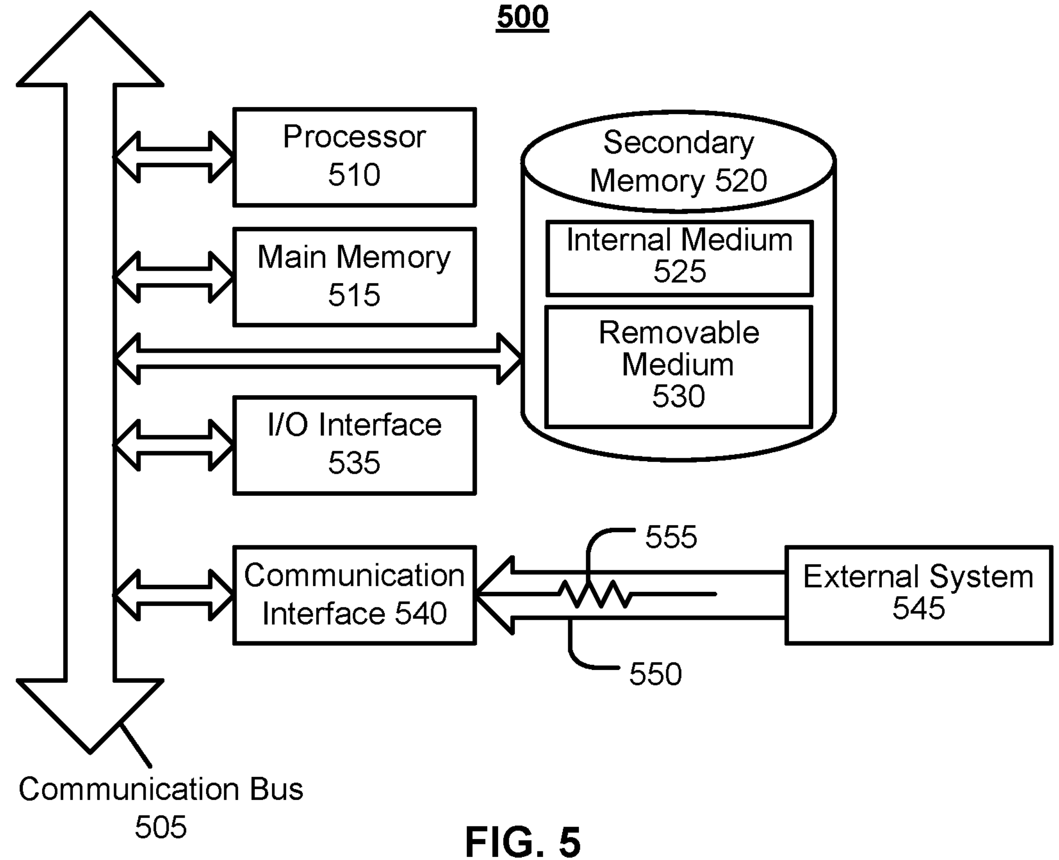
FIG. 5 illustrates an example processing system, by which one or more of the processes described herein may be executed, according to an embodiment.

FIG. 5 illustrates an example processing system 500, by which one or more of the processes described herein may be executed, according to an embodiment. For example, system 200 may be used as or in conjunction with one or more of the processes (e.g., 300 and/or 400), methods, or functions described herein, and may represent components of IP-over-S7221 device 200, remote terminal 130, bus controller 140, bus monitor 150, and/or any other processing device described herein.

System 500 may comprise one or more processors 510. Processor(s) 510 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a subordinate processor (e.g., back-end processor), an additional microprocessor or controller for dual or multiple processor systems, and/or a coprocessor. Such auxiliary processors may be discrete processors or may be integrated with a main processor 510. Examples of processors which may be used with system 500 include, without limitation, any of the processors (e.g., Pentium™, Core i7™, Core i9™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor(s) 510 may be connected to a communication bus 505. Communication bus 505 may include a data channel for facilitating information transfer between storage and other peripheral components of system 500. Furthermore, communication bus 505 may provide a set of signals used for communication with processor 510, including a data bus, address bus, and/or control bus (not shown). Communication bus 505 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 500 may comprise main memory 515. Main memory 515 provides storage of instructions and data for programs executing on processor 510, such as any of the software discussed herein. It should be understood that programs stored in the memory and executed by processor 510 may be written and/or compiled according to any suitable language, including without limitation C/C++, Java, JavaScript, Perl, Python, Visual Basic, .NET, and the like. Main memory 515 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

System 500 may comprise secondary memory 520. Secondary memory 520 is a non-transitory computer-readable medium having computer-executable code and/or other data (e.g., any of the software disclosed herein) stored thereon. In this description, the term "computer-readable medium" is used to refer to any non-transitory computer-readable storage media used to provide computer-executable code and/or other data to or within system 500. The computer software stored on secondary memory 520 is read into main memory 515 for execution by processor 510. Secondary memory 520 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Secondary memory 520 may include an internal medium 525 and/or a removable medium 530. Internal medium 525 and removable medium 530 are read from and/or written to in any well-known manner. Internal medium 525 may comprise one or more hard disk drives, solid state drives, and/or the like. Removable storage medium 530 may be, for example, a magnetic tape drive, a compact disc (CD) drive, a digital versatile disc (DVD) drive, other optical drive, a flash memory drive, and/or the like.

System 500 may comprise an input/output (I/O) interface 535. I/O interface 535 provides an interface between one or more components of system 500 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing systems, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like.

System 500 may comprise a communication interface 540. Communication interface 540 allows data to be transferred between system 500 and external devices, networks, or other information sources. In an embodiment in which system 500 is IP-over-S7221 device 200, communication interface 540 may comprise both network adapter 210 and S7221 adapter 260. In this case, data may be transferred between system 500 and a remote system 270 via network adapter 210, and between system 500 and MS1553 bus 100 via S7221 adapter 260. Examples of communication interface 540 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 500 with a network (e.g., IP network 160) or another computing device. Communication interface 540 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated services digital network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software transferred via communication interface 540 is generally in the form of electrical communication signals 555. These signals 555 may be provided to communication interface 540 via a communication channel 550 between communication interface 540 and an external system 545 (e.g., remote system 270, MS1553 bus 100, etc.). In an embodiment, communication channel 550 may be a wired or wireless network (e.g., IP network 160), or any variety of other communication links. Communication channel 550 carries signals 555 and can be implemented using a variety of wired or wireless communication means including wire or cable, fiber optics, conventional phone line, cellular phone link, wireless data communication link, radio frequency ("RF") link, or infrared link, just to name a few.

Computer-executable code is stored in main memory 515 and/or secondary memory 520. Computer-executable code can also be received from an external system 545 (e.g., remote system 270) via communication interface 540 and stored in main memory 515 and/or secondary memory 520. Such computer-executable code, when executed, may enable system 500 to perform the various functions of the disclosed embodiments as described elsewhere herein.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

As used herein, the terms "comprising," "comprise," and "comprises" are open-ended. For instance, "A comprises B" means that A may include either: (i) only B; or (ii) B in combination with one or a plurality, and potentially any number, of other components. In contrast, the terms "consisting of," "consist of," and "consists of" are closed-ended. For instance, "A consists of B" means that A only includes B with no other component in the same context.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A device that comprises:
a first adapter configured to connect to an Internet Protocol (IP) network;
a second adapter configured to be connected to a Military Standard 1553 (MS1553) bus;
at least one hardware processor; and
software that is configured to, when executed by the at least one hardware processor, receive first IP data from the IP network via the first adapter,
convert the first IP data into first transport data in accordance with Standard Agreement 7221 (S7221), and
transmit the first transport data on the MS1553 bus within a frequency range of 25 Megahertz to 65 Megahertz.

2. The device of claim 1, wherein the software is further configured to, when executed by the at least one hardware processor:
receive second transport data from the MS1553 bus;
convert the second transport data into second IP data in accordance with the Internet Protocol; and
transmit the second IP data over the IP network.

3. The device of claim 1, wherein the IP data comprise a plurality of IP packets, and wherein converting the IP data into transport data comprises converting the plurality of IP packets into messages according to the S7221.

4. The device of claim 1, wherein the device further comprises a network layer that implements bridging of the IP data between the IP network and a separate IP network.

5. The device of claim 4, wherein the bridging comprises including IP addresses and physical addresses from the IP data in the transport data.

6. The device of claim 1, wherein the device further comprises a network layer that implements routing of the IP data from the IP network to a separate IP network.

7. The device of claim 6, wherein the routing comprises including IP addresses from the IP data in the transport data.

8. The device of claim 1, wherein the first adapter comprises an Ethernet port.

9. The device of claim 1, wherein the second adapter comprises a port for a twin-axial cable.

10. An assembly comprising:
the dev ice of claim 1; and
a cryptographic module that one or both of encrypts IP data or decrypts IP data.

11. The assembly of claim 10, wherein the cryptographic module comprises a High Assurance Internet Protocol Encryptor.

12. The assembly of claim 10, wherein the cryptographic module encrypts the first IP data prior to be converted into the first transport data.

13. The assembly of claim 12, wherein the cryptographic module decrypts second IP data after being converted from second transport data.

14. An assembly comprising:
the device of claim 1; and
the MS1553 bus, which comprises at least one pair of conductors.

15. The assembly of claim 14, wherein the MS1553 bus comprises a plurality of pairs of conductors.

16. The assembly of claim 15, wherein the first transport data are transmitted redundantly over the plurality of pairs of conductors.

17. The assembly of claim 15, wherein the first transport data are transmitted across the plurality of pairs of conductors in a bonded manner.

18. A method comprising using at least one hardware processor of a device, which comprises a first adapter configured to connect to an Internet Protocol (IP) network and a second adapter configured to be connected to a Military Standard 1553 (MS1553) bus, to:
receive first IP data from the IP network via the first adapter;
convert the first IP data into first transport data in accordance with Standard Agreement 7221 (S7221); and
transmit the first transport data on the MS1553 bus within a frequency range of 25 Megahertz to 65 Megahertz.

19. The method of claim 18, further comprising using the at least one hardware processor to:
receive second transport data from the MS1553 bus;
convert the second transport data into second IP data in accordance with the Internet Protocol; and
transmit the second IP data over the IP network.

20. A non-transitory computer-readable medium having instructions stored therein, wherein the instructions, when executed by a processor of a device, which comprises a first adapter configured to connect to an Internet Protocol (IP) network and a second adapter configured to be connected to a Military Standard 1553 (MS1553) bus, cause the processor to:
receive first IP data from the IP network via the first adapter;
convert the first IP data into first transport data in accordance with Standard Agreement 7221 (S7221);
transmit the first transport data on the MS1553 bus within a frequency range of 25 Megahertz to 65 Megahertz;
receive second transport data from the MS1553 bus;
convert the second transport data into second IP data in accordance with the Internet Protocol; and
transmit the second IP data over the IP network.

* * * * *